US012734510B2

(12) United States Patent
Lu et al.

(10) Patent No.: US 12,734,510 B2
(45) Date of Patent: Sep. 15, 2026

(54) FLOWER-LIKE FERROCERIUM COMPOSITE MATERIAL SUPPORTED WITH PLATINUM AND ITS PREPARATION METHOD AND APPLICATION IN LOW-TEMPERATURE THERMOCATALYTIC TREATMENT OF TOLUENE

(71) Applicant: SOOCHOW UNIVERSITY, Suzhou (CN)

(72) Inventors: Jianmei Lu, Suzhou (CN); Dongyun Chen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 296 days.

(21) Appl. No.: 18/033,409

(22) PCT Filed: Dec. 22, 2021

(86) PCT No.: PCT/CN2021/140638
§ 371 (c)(1),
(2) Date: Sep. 19, 2023

(87) PCT Pub. No.: WO2022/089668
PCT Pub. Date: May 5, 2022

(65) Prior Publication Data
US 2025/0269359 A1 Aug. 28, 2025

(51) Int. Cl.
*B01J 23/00* (2006.01)
*B01J 23/89* (2006.01)
(Continued)

(52) U.S. Cl.
CPC ............. *B01J 23/894* (2013.01); *B01J 35/50* (2024.01); *B01J 37/04* (2013.01); *B01J 37/086* (2013.01); *B01J 37/12* (2013.01); *B01J 2235/30* (2024.01)

(58) Field of Classification Search
CPC . B01J 23/894; B01J 35/50; B01J 37/04; B01J 37/086; B01J 37/12; B01J 2235/30
(Continued)

(56) References Cited

FOREIGN PATENT DOCUMENTS

CN 104676610 A 6/2015
CN 105833878 A * 8/2016 ............. B01J 23/83
(Continued)

*Primary Examiner* — James E McDonough
(74) *Attorney, Agent, or Firm* — SZDC Law PC

(57) ABSTRACT

A method for preparing a platinum-loaded flower-like iron-cerium composite material includes: subjecting an iron salt solvent to thermal reaction and then calcining to obtain a flower-like porous iron oxide; in the presence of a chelating agent, reacting the flower-like iron oxide with a cerium salt in a solvent to obtain a flower-like iron-cerium composite material; mixing the flower-like iron-cerium composite material with a solution containing a platinum salt, the solvent is removed, and then performing low-temperature calcination to obtain a platinum-loaded flower-like iron-cerium composite material. The application of the platinum-loaded flower-like iron-cerium composite material includes: placing the platinum-loaded flower-like iron-cerium composite material into an environment containing toluene, performing heating at a low temperature, and completing treatment of the toluene. The present invention uses a fixed bed reactor to complete treatment of toluene, and preferably, the optimal temperature for low-temperature complete catalytic oxidation of toluene gas is 195° C.

10 Claims, 5 Drawing Sheets

(51) Int. Cl.

| | |
|---|---|
| ***B01J 35/50*** | (2024.01) |
| ***B01J 37/04*** | (2006.01) |
| ***B01J 37/08*** | (2006.01) |
| ***B01J 37/12*** | (2006.01) |

(58) Field of Classification Search
USPC .......................................................... 502/304
See application file for complete search history.

(56) References Cited

FOREIGN PATENT DOCUMENTS

| | | | |
|---|---|---|---|
| CN | 106093137 | A | 11/2016 |
| CN | 108314089 | A | 7/2018 |
| CN | 110813303 | A | 2/2020 |
| CN | 111036201 | A | 4/2020 |
| CN | 112452339 | A | 3/2021 |
| JP | 2009082908 | A | 4/2009 |

* cited by examiner

FLOWER-LIKE FERROCERIUM COMPOSITE MATERIAL SUPPORTED WITH PLATINUM AND ITS PREPARATION METHOD AND APPLICATION IN LOW-TEMPERATURE THERMOCATALYTIC TREATMENT OF TOLUENE

This application is the National Stage Application of PCT/CN2021/140638, filed on Dec. 22, 2021, which claims priority to Chinese Patent Application No. 202011160061.6, filed on Oct. 26, 2020, which is incorporated by reference for all purposes as if fully set forth herein.

TECHNICAL FIELD

The invention belongs to the technical field of nano-composite materials, and in particular relates to a flower-like ferrocerium composite material supported with platinum and its preparation method and application in low-temperature thermocatalytic treatment of toluene.

BACKGROUND OF INVENTION

With the rapid development of the economic society, air pollution has been becoming increasingly serious, bringing great harm to humans, animals and plants. Among them, volatile organic compounds (VOCs) (such as formaldehyde, acetaldehyde, benzene, toluene, xylene, etc.) are difficult to be completely removed due to their wide varieties and low concentration, and can form secondary pollutants, making them the top priority of air pollution control. Toluene is one of the common volatile organic compounds in indoor environments, and its emissions mainly come from building materials, interior decoration materials, and daily life and office supplies; and the incomplete combustion of household fuels and tobacco leaves poses a serious threat to human health, therefore it's crucial to deal with toluene gas pollution for the future development. Usually, precious metal catalysts are often used for low-temperature catalytic oxidation of toluene, and in practical applications, precious metals typically require support from carriers to achieve better dispersion and stability. The commonly used carriers include $CeO_2$, $MnO_2$ and $Co_3O_4$, etc. The carrier plays an important role in the flow of electrons during the catalytic process. In order to improve the catalytic effect and economy, the bimetallic oxides have become a good choice. It utilizes the interaction between the bimetallics to better promote electron transfer and effectively improve catalytic performance.

Ferric oxide is a convenient and cheap carrier for preparation, but its low-temperature thermocatalytic activity still needs to be improved, while cerium oxide is a rare material with abundant reserves in China, and it has good ability to store and release oxygen. The existing technology is relatively complex for how to combine the advantages of the both, and how to uniformly support the metal nanoparticles on their surfaces, as well as how to realize the catalysis of the catalyst at low temperature, which are urgently needed to be solved. Therefore, it is necessary to develop an effective method and supported catalyst aimed at the current situation.

Technical Problems

The purpose of the invention is to provide a flower-like ferrocerium composite material supported with platinum and its preparation method. Platinum nanoparticles are supported onto the flower-like ferrocerium composite material by the impregnation method, so as to achieve the purpose of efficiently treating toluene gas at low temperature.

Technical Solution

In order to achieve the above objective, the present invention adopts the following specific technical solutions as follows:

The preparation method of a flower-like ferrocerium composite material supported with platinum includes the following steps:

(1) The ferric salt is calcined after solvothermal reaction to obtain flower-like porous ferric oxide;

(2) In the presence of chelating agent, the flower-like ferric oxide is reacted with cerium salt in a solvent to obtain flower-like ferrocerium composite material;

(3) The flower-like ferrocerium composite material is mixed with the solution containing platinum salt, after that, the solvent is removed, and then it is calcined at low temperature to obtain the flower-like ferrocerium composite material supported with platinum.

A method for low-temperature thermocatalytic treatment of toluene includes the following steps:

(1) The ferric salt is calcined after solvothermal reaction to obtain flower-like porous ferric oxide;

(2) In the presence of chelating agent, the flower-like ferric oxide is reacted with cerium salt in a solvent to obtain flower-like ferrocerium composite material;

(3) The flower-like ferrocerium composite material is mixed with the solution containing platinum salt, after that, the solvent is removed, and then it is calcined at low temperature to obtain the flower-like ferrocerium composite material supported with platinum;

(4) The flower-like ferrocerium composite material supported with platinum is placed in an environment containing toluene, and heated at low temperature to complete the treatment of toluene.

In the present invention, the ferric salt is a ferric sulfate hydrate; the cerium salt is cerium nitrate hexahydrate; the platinum salt is chloroplatinic acid, and the solvent containing platinum salt is water; the chelating agent is hexamethylenetetramine (HMT).

In the present invention, the ferric salt is mixed in ethanol and then subjected to solvothermal reaction; preferably, the temperature for mixing ferric sulfate hydrate with ethanol is range from 50 to 60° C., and the time is range from 3 to 4 hours, and further preferably, the temperature for mixing ferric sulfate hydrate with ethanol is at 50° C. for 3 hours; the temperature of the solvothermal reaction is range from 140 to 160° C., and the time is range from 20 to 30 hours, and preferably, the temperature of the solvothermal reaction is at 150° C. for 24 hours; the calcination of the obtained product is carried out in the air at the range of temperature from 600 to 700° C. for 10 minutes, and preferably, the heating rate is 10° C./min at 700° C. for 10 minutes. The dosage ratio of ferric sulfate hydrate to ethanol is (0.12-0.13 g):(28-32 mL), and the preferred dosage ratio of ferric sulfate hydrate to ethanol is 0.12 g:30 mL.

In the present invention, the solvent is a mixed solution of water and ethanol, and the volume ratio of water and ethanol is 1:1; the reaction temperature between flower-like ferric oxide and cerium salt is at the range of temperature from 60° C. to 80° C. for 3 to 4 hours; preferably, the reaction temperature is 70° C., and the time is 3 hours. The chelating agent is added in solution form, preferably the chelating agent solution concentration is 0.02 g/mL; and the molar ratio of ferrum to cerium is (1-6):1.

In the present invention, the low calcination temperature is range from 200° C. to 250° C., and the time is 2-3 hours, and preferably, the low calcination temperature is 200° C., the heating rate is 2° C./min, and the time is 2 hours. The mass fraction of platinum element in the ferric cerium composite is range from 0.5 wt % to 3 wt %.

The present invention firstly adopts solvothermal method and then produces a porous flower-like ferric oxide by rapid heating calcination method, which has uniform pore size, controllable structure and good repeatability. Subsequently, the further recombination of ferrum and cerium elements promotes the electron transfer between elements in the reaction process, making it a good carrier for supporting platinum nanoparticles. When platinum nanoparticles are supported, simple low-temperature calcination is adopted to directly support the platinum nanoparticles on the surface of the flower-like ferrocerium composite material. The formed platinum nanoparticles are very small in size and uniformly supported on the surface of the catalyst, which is conducive to low-temperature catalytic oxidation of toluene.

After low-temperature calcination, the flower-like ferrocerium composite material quantitatively supported with platinum nanoparticles is put into a toluene environment with a certain concentration, heated and catalyzed by a fixed bed reactor, and the temperature of complete catalytic oxidation of toluene is found by GC-MS test to realize low-temperature catalytic oxidation of toluene.

The present invention further discloses the application of the flower-like ferrocerium composite material supported with platinum nanoparticles in low-temperature catalytic oxidation of toluene.

In the method of low-temperature thermocatalytic treatment of toluene disclosed by the present invention, the flower-like ferrocerium composite material supported with platinum nanoparticles is placed in an environment containing toluene, and a fixed bed reactor is used to complete the treatment of toluene. Preferably, the optimal temperature for low-temperature complete catalytic oxidation of toluene gas is 195 C.

Beneficial Effects

The present invention has the following advantages:

1. The flower-like ferrocerium composite material supported with platinum nanoparticles disclosed by the present invention has uniform pore size and controllable structure, and the formed platinum nanoparticles have very small particle size and are uniformly supported on the catalyst surface, which is a good supported catalyst material.
2. The flower-like ferrocerium composite material supported with platinum nanoparticles disclosed by the present invention has simple preparation method, low cost, easy availability of raw materials, excellent catalytic performance, and can realize lower-temperature catalytic oxidation of toluene, which has better economic usefulness.

EXAMPLES OF THE PRESENT INVENTION

The preparation method of a flower-like ferrocerium composite material supported with platinum nanoparticles in the present invention is as follows: (1) The ferric sulfate hydrate is added to anhydrous ethanol and mixed for solvothermal reaction, and then the obtained product is washed and dried before calcination to obtain flower-like porous ferric oxide; (2) The flower-like ferric oxide is dispersed in the mixed solution of water and ethanol, and a certain amount of cerium nitrate hexahydrate and HMT solution are added, and the flower-like ferric cerium composite is obtained after stirring reaction at a certain temperature; (3) The flower-like ferrocerium composite material is soaked in the solution containing platinum salt, after that, the solvent is removed after stirring, and then it is calcined at low temperature to obtain the flower-like ferrocerium composite material supported with platinum.

Example 1

Figure 1:
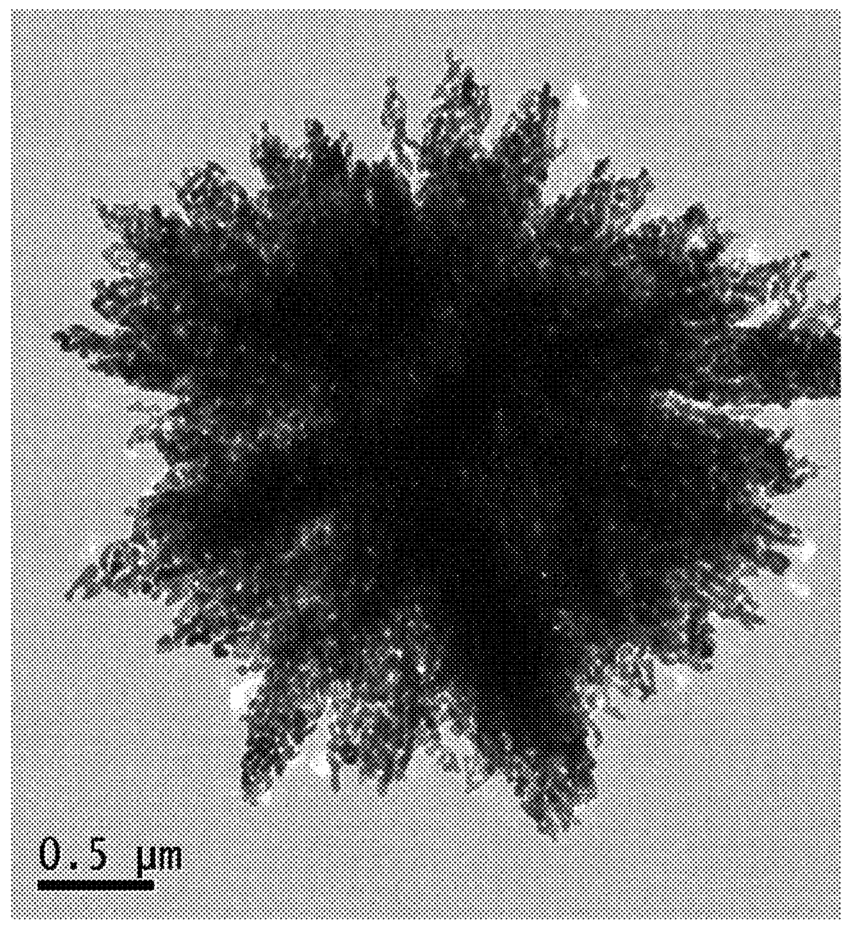
FIG. 1 shows the transmission electron microscopy (TEM) image of the flower-like $Fe_2O_3$.
Figure 2:
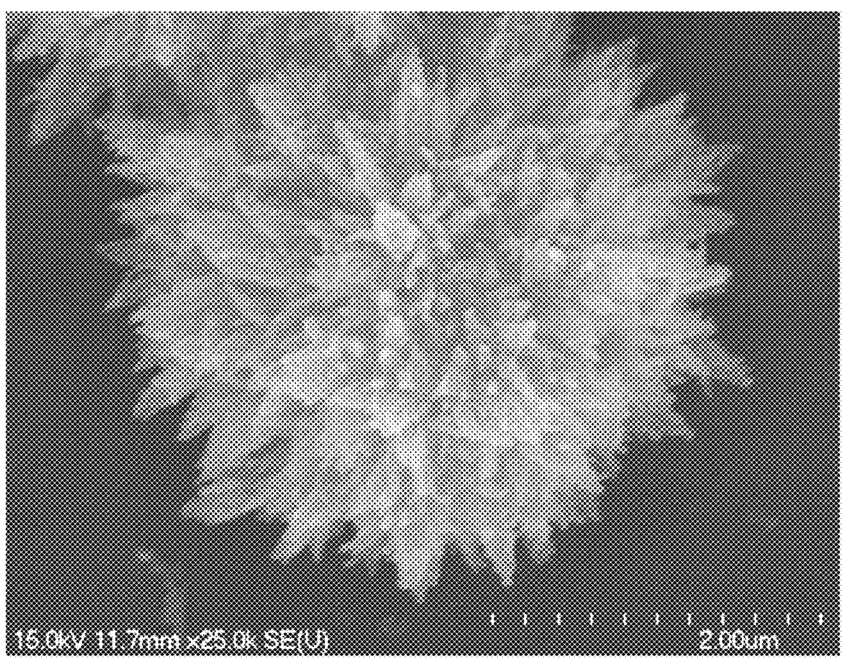
FIG. 2 shows the scanning electron microscopy (SEM) image of the flower-like $Fe_2O_3$.

The specific steps for preparing flower-like porous ferric oxide are as follows:

0.12 g ferric sulfate hydrate [CAS No. 15244-10-7] was dispersed in 30 mL anhydrous ethanol and placed in an environment of 50° C. for conventional stirring for 3 h. Then the obtained light-yellow dispersion was transferred to a 50 mL high-pressure reactor for 24 h reaction at 150° C. and cooled to room temperature naturally. Then the obtained light-yellow powder was washed with ethanol twice, dried at 60° C. for 12 h, and then transferred to a muffle furnace to increase the temperature from room temperature to 700° C. with the heating rate of 10° C./min for 10 minutes, and then cool to room temperature naturally to obtain the flower-like porous ferric oxide (flower-like $Fe_2O_3$). FIG. 1 shows the TEM image of the flower-like $Fe_2O_3$, and FIG. 2 shows the SEM image of the flower-like $Fe_2O_3$. From the figure, it can be seen that the flower-like ferric oxide has a good morphology and a uniform pore structure.

Example 2

Figure 3:
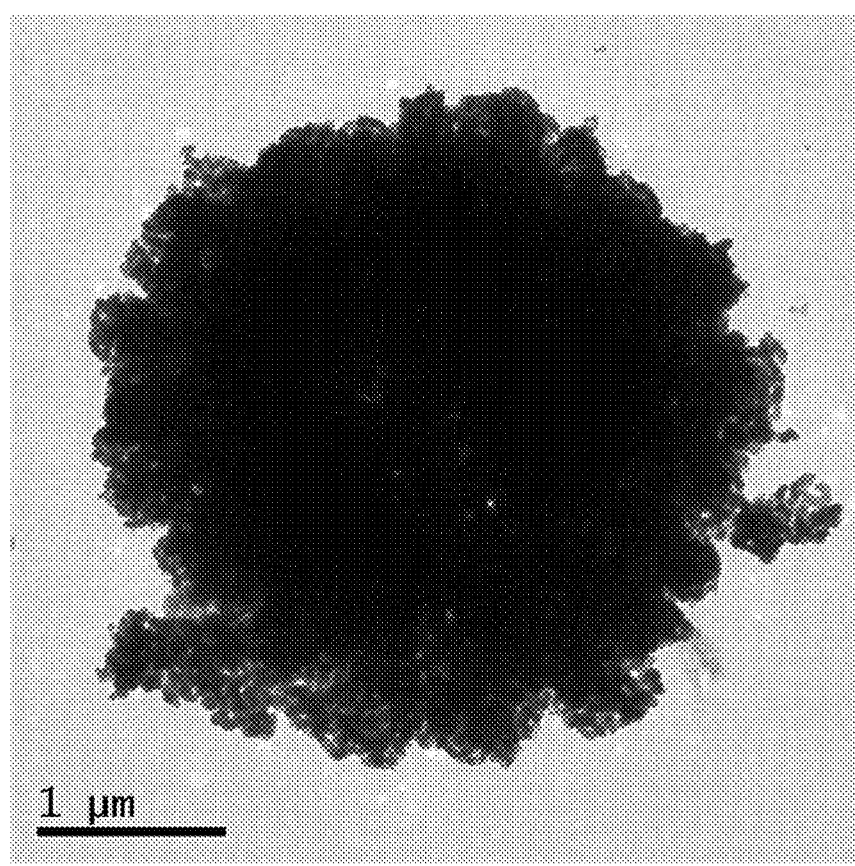
FIG. 3 shows the transmission electron microscopy (TEM) image of the flower-like $Fe_2O_3$—$CeO_2$.
Figure 4:
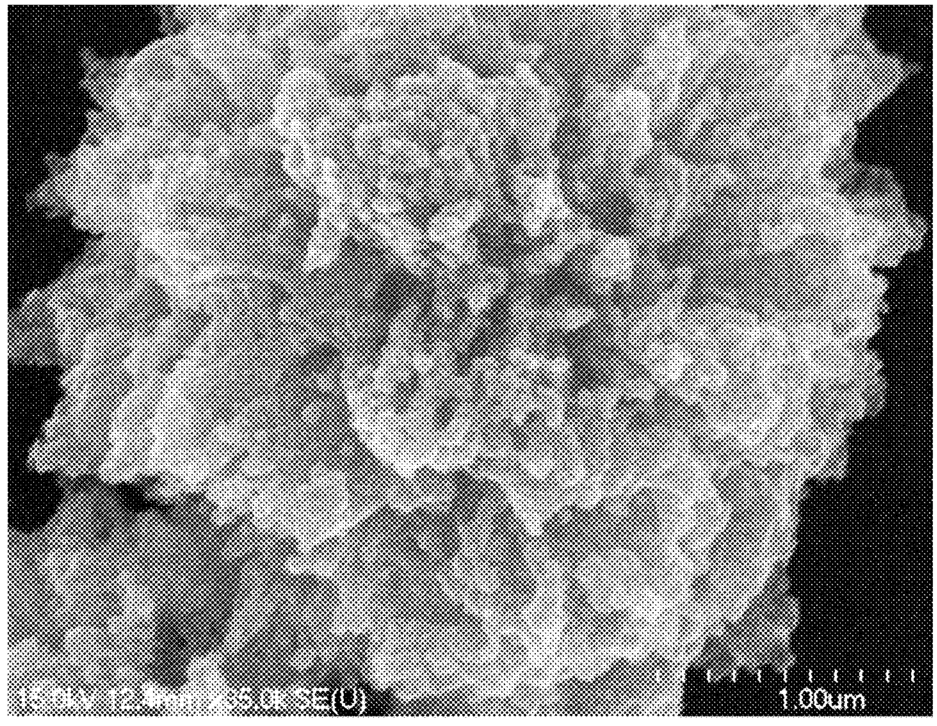
FIG. 4 shows the scanning electron microscopy (SEM) image of the flower-like $Fe_2O_3$—$CeO_2$.

The specific steps for preparing flower-like ferrocerium composite material are as follows:

0.15 g flower-like $Fe_2O_3$ and 0.27 g cerium nitrate hexahydrate (the molar ratio of ferric to cerium is 3:1) were dispersed in a mixed solution of 15 mL water and 15 mL ethanol for conventional ultrasonic dispersion for 15 minutes. Then, 15 mL 0.02 g/mL of HMT aqueous solution was added, the mixed solution was placed at 70° C. for 3 h reaction, cooled to room temperature, washed three times with deionized water and ethanol, and dried at 60° C. for 12 h to obtain the flower-like ferrocerium composite material. FIG. 3 shows the TEM image of the flower-like ferrocerium composite material and FIG. 4 shows the SEM image of the flower-like ferrocerium composite material. From the figure, it can be seen that ferric oxide successfully combined with cerium oxide.

The other flower-like ferrocerium composite materials can be obtained by changing the molar ratio of ferric to cerium.

Example 3

The specific steps for preparing flower-like ferrocerium composite material supported with platinum are as follows:

0.15 g flower-like ferrocerium composite material was mixed with aqueous solution of chloroplatinic acid (mass fraction of platinum in ferrocerium composite was 1 wt %), dispersed for 2 h by conventional ultrasonic, and then evaporated to remove the solvent at 80° C.; Then, the product was calcined at low temperature in the air atmosphere, and the heating rate was 2° C./min (the room temperature rose to 200° C.), the temperature was 200° C., and the time was 2 h. The flower-like ferrocerium composite supported with platinum with large specific surface area and uniform distribution of nanoparticles was obtained through calcination.

Figure 5:
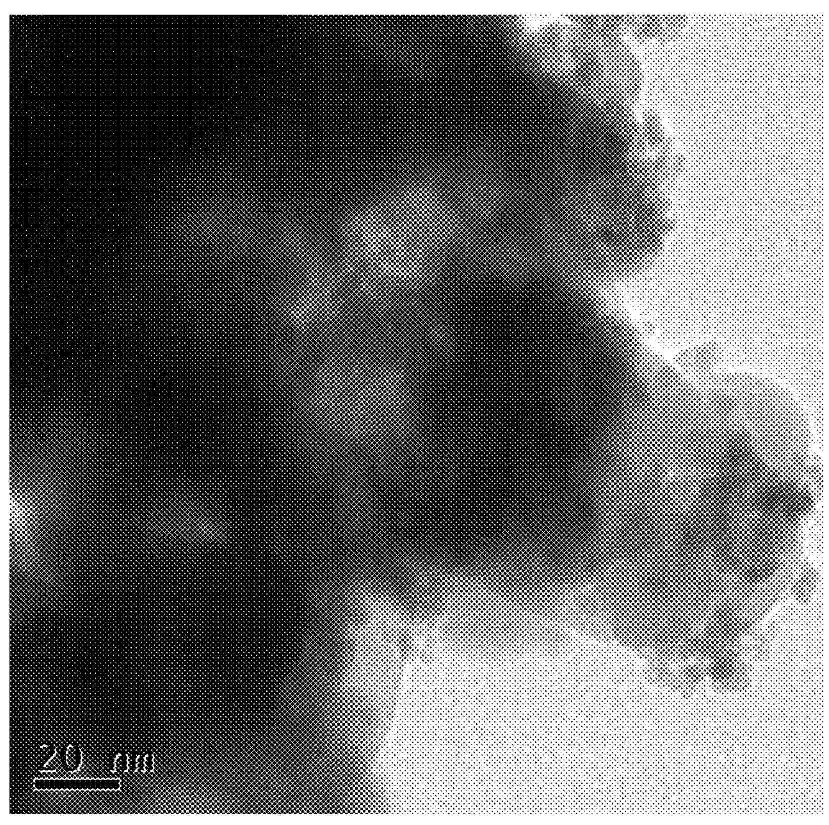
FIG. 5 shows the transmission electron microscopy (TEM) image of Pt/$Fe_2O_3$—$CeO_2$ composite material.
Figure 6:
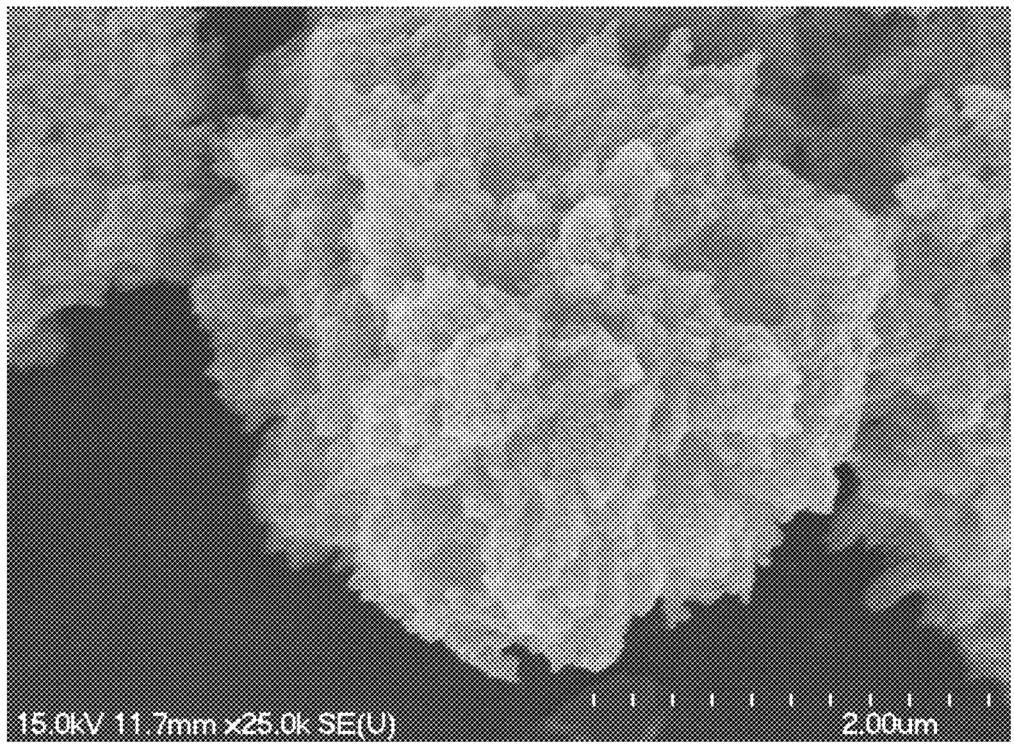
FIG. 6 shows the scanning electron microscopy (SEM) image of Pt/$Fe_2O_3$—$CeO_2$ composite material.

FIG. 5 shows the TEM image of the flower-like ferrocerium composite material supported with platinum and FIG. 6 shows the SEM image of the flower-like ferrocerium composite material supported with platinum. It can be seen from the figures that platinum particles were successfully supported on the catalyst surface, and the distribution of metal nanoparticles was relatively uniform.

The other flower-like ferrocerium composite materials supported with platinum can be obtained by changing the mass fraction of platinum in the ferrocerium composite material.

Example 4

The specific steps for testing the performance of the catalyst are as follows:

In this Example, the thermocatalytic conditions for toluene gas are as follows: toluene concentration was 50 ppm, catalyst amount was 50 mg, the catalyst was fixed on a fixed-bed reactor through a U-shaped tube, and the catalytic effect of the composite material on toluene gas under heating condition was analyzed by gas chromatography.

Figure 7:
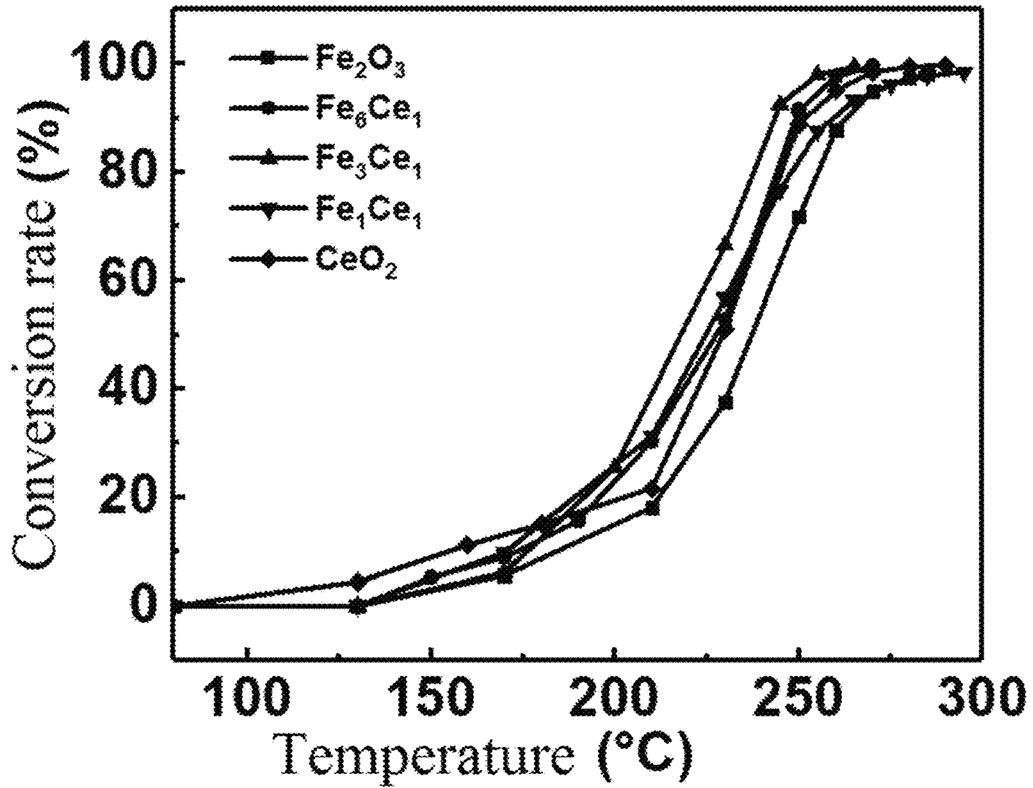
FIG. 7 shows the thermocatalytic effect curve of a flower-like ferrocerium composite material to toluene gas.
Figure 8:
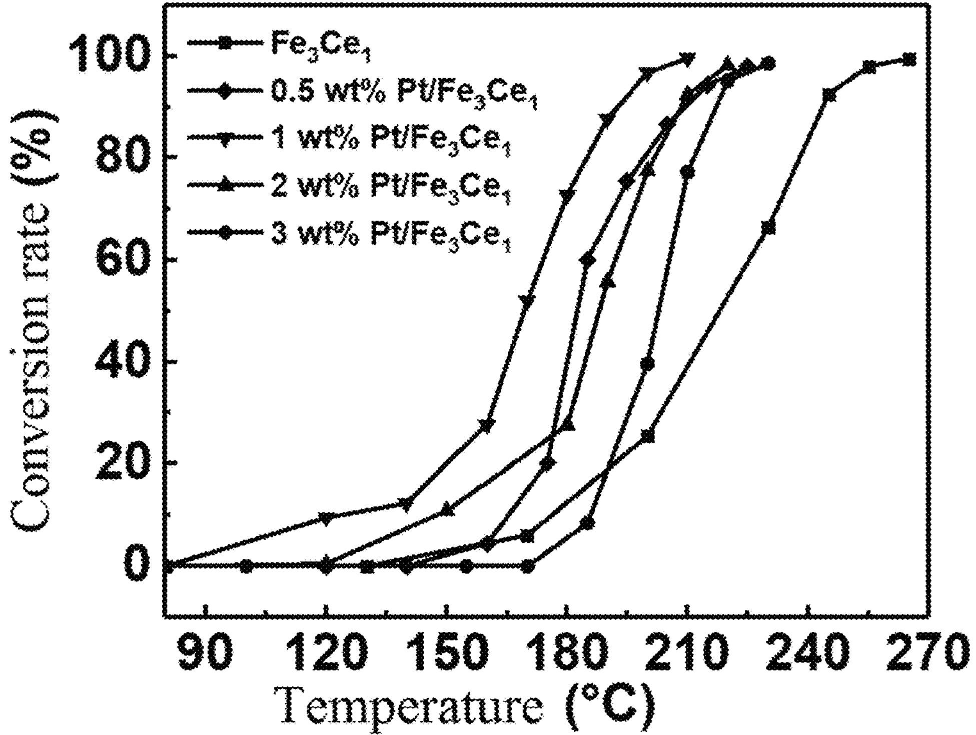
FIG. 8 shows the thermocatalytic effect curve of a flower-like ferrocerium composite material supported with platinum nanoparticles to toluene gas.

FIG. 7 shows the thermocatalytic effect curve of a flower-like ferrocerium composite material to toluene gas and FIG. 8 shows the thermocatalytic effect curve of a flower-like ferrocerium composite material supported with platinum nanoparticles to toluene gas. It can be seen from FIGS. 7 and 8 that the present invention can be applied to the conversion of toluene at lower temperatures. Toluene pollution in the air mainly comes from building materials, indoor decoration materials, daily life and office supplies, outdoor industrial waste gas, automobile exhaust, photochemical smoke, etc. The specific catalytic effect of toluene was analyzed by gas chromatography. The conversion rate of toluene was calculated by equation $$\eta = \frac{C_0 - C}{C_0} \times 100\%.$$

$C_0$ and C were the initial concentration and test concentration of toluene respectively in the experiment (tested every 15 minutes).

Figure 9:
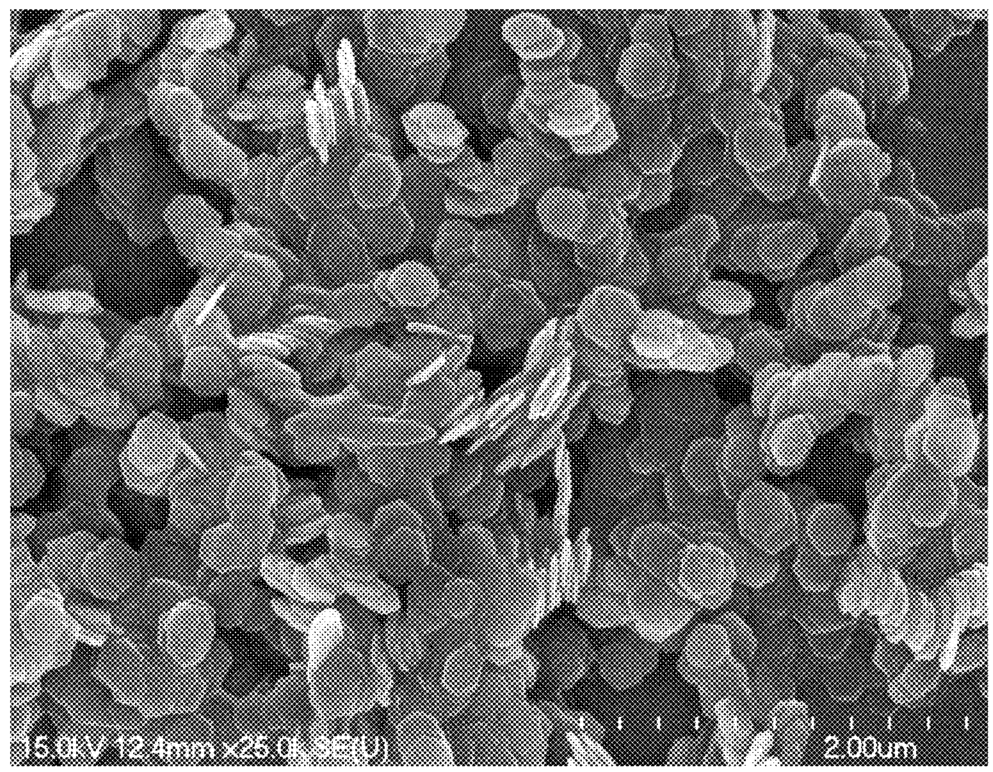
FIG. 9 shows the scanning electron microscopy (SEM) image of the hexagonal $Fe_2O_3$.
Figure 10:
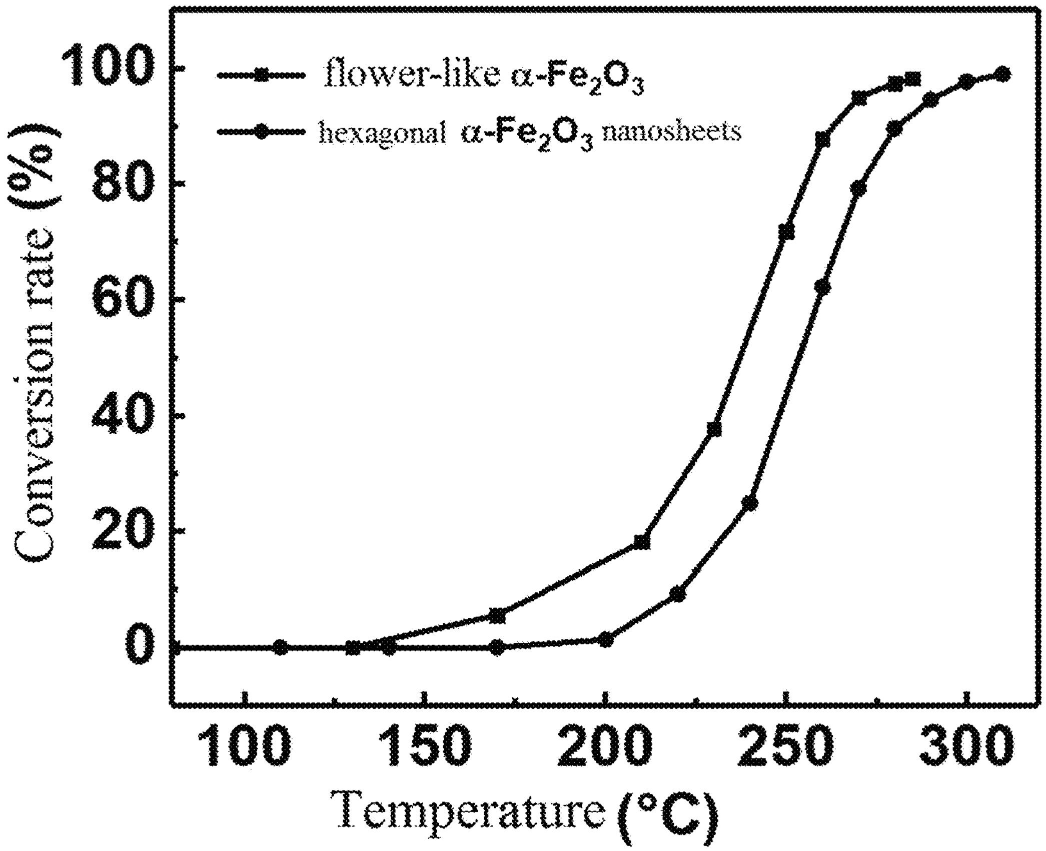
FIG. 10 shows a comparison of the thermocatalytic effects of lower-like $Fe_2O_3$ and hexagonal $Fe_2O_3$ to toluene gas.

11.06 g $FeCl_3 \cdot 6H_2O$ was dispersed in a mixed solution of 2.8 mL water and 40 mL ethanol and stirred evenly, and then 3.2 g sodium acetate was added for ultrasonic dispersion for 10 min. The mixed solution was placed in a 100 mL hydrothermal reactor for 12 h reaction at 180° C., and then the precipitation was washed three times with ethanol for three times and dried at 60° C. for 12 h to obtain the hexagonal flake ferric oxide. FIG. 9 shows the scanning electron microscopy image of the hexagonal ferric oxide and FIG. 9 shows a comparison of the thermocatalytic effects of hexagonal ferric oxide and lower-like oxide to toluene gas (the same catalytic experiment operation). It can be seen from FIG. 10 that the catalytic oxidation effect of flower-like ferric oxide was significantly better than that of hexagonal ferric oxide.

Through the above analysis, it is shown that the platinum nanoparticles in the technical solution of the present invention can be successfully supported on the surface of the flower-like ferrocerium composite catalyst, with relatively uniform distribution, and have relatively good catalytic activity for toluene. Using ferrocerium composite as the carrier is beneficial to the stability of the catalyst and greatly reduces the production cost of the catalyst. In addition, the ordered pore structure of the catalyst is also conducive to the process of adsorption and catalysis. The invention can also realize the catalytic oxidation of toluene at low temperature, so it has good application prospects.

The invention claimed is:

1. A flower-like ferrocerium composite material supported with platinum, wherein the flower-like ferrocerium composite material supported with platinum is prepared by a method comprising the following steps:

(1) calcining a ferric salt after a solvothermal reaction to obtain a flower-like porous ferric oxide;

(2) in the presence of a chelating agent, reacting the flower-like ferric oxide with a cerium salt in a solvent to obtain a flower-like ferrocerium composite material; and (3) mixing the flower-like ferrocerium composite material with a solution containing a platinum salt, afterwards, removing a solvent, and calcining at low temperature to obtain the flower-like ferrocerium composite material supported with platinum.

2. The flower-like ferrocerium composite material supported with platinum according to claim 1, wherein the ferric salt is a ferric sulfate hydrate; the cerium salt is cerium nitrate hexahydrate; the platinum salt is chloroplatinic acid; and the solvent containing the platinum salt is water; the chelating agent is hexamethylenetetramine.

3. The flower-like ferrocerium composite material supported with platinum according to claim 1, wherein the ferric salt is mixed in ethanol and then subjected to the solvothermal reaction.

4. The flower-like ferrocerium composite material supported with platinum according to claim 1, wherein in step (1), a temperature of the solvothermal reaction is range from 140 to 160° C., a reaction time is range from 20 to 30 hours, and the calcination is carried out in air at a temperature from 600 to 700° C. for 10 minutes.

5. The flower-like ferrocerium composite material supported with platinum according to claim 1, wherein in step (2), the solvent is a mixed solution of water and ethanol; a reaction temperature between flower-like ferric oxide and the cerium salt is from 60° C. to 80° C.; a reaction time is 3 to 4 hours; a molar ratio of ferrum to cerium is (1-6):1.

6. The flower-like ferrocerium composite material supported with platinum according to claim 1, wherein a low calcination temperature is 200° C. to 250° C., and a reaction time is 2-3 hours.

7. An application of the flower-like ferrocerium composite material supported with platinum according to claim 1 in a low-temperature catalytic oxidation of toluene.

8. A method for low-temperature thermocatalytic treatment of toluene comprising the following steps:

(1) calcining a ferric salt after a solvothermal reaction to obtain a flower-like porous ferric oxide;

(2) in the presence of a chelating agent, reacting the flower-like ferric oxide with a cerium salt in a solvent to obtain a flower-like ferrocerium composite material;

(3) mixing the flower-like ferrocerium composite material with a solution containing a platinum salt, afterwards, removing a solvent, and calcining at low temperature to obtain the flower-like ferrocerium composite material supported with platinum; and (4) placing the flower-like ferrocerium composite material supported with platinum in an environment containing toluene, and heating at low temperature to complete the treatment of toluene.

9. The method for low-temperature thermocatalytic treatment of toluene according to claim 8, wherein a mass ratio of platinum element in the ferric cerium composite is range from 0.5 wt % to 3 wt % in step (3).

10. The method for low-temperature thermocatalytic treatment of toluene according to claim 8, wherein the temperature for low-temperature heating is from 150° C. to 200° C.

* * * * *